United States Patent
Hartl et al.

[11] Patent Number: 5,813,230
[45] Date of Patent: Sep. 29, 1998

[54] BRAKE LINKAGE AND MASTER BRAKE CYLINDER

[75] Inventors: Matthias Hartl, Kernen; Harry Tröster, Tamm; Rainer Freitag, Nürtingen; Martina Richerzhagen, Clausthal-Zellerfeld, all of Germany

[73] Assignee: Mercedes-Benz AG, Stuttgart, Germany

[21] Appl. No.: 754,649

[22] Filed: Nov. 21, 1996

[30] Foreign Application Priority Data

Nov. 23, 1995 [DE] Germany ............ 195 43 698.9

[51] Int. Cl.⁶ ................ F15B 7/00; B60T 7/02
[52] U.S. Cl. ................................ 60/591; 60/594
[58] Field of Search ............. 60/547.1, 591, 60/592, 594

[56] References Cited

U.S. PATENT DOCUMENTS 5,544,948  8/1996  Schmidt et al. .

FOREIGN PATENT DOCUMENTS

| 0708006A1 | 4/1996 | European Pat. Off. . |
| 4335769C1 | 12/1994 | Germany . |
| 56-43666 | 9/1979 | Japan . |
| 2178497 | 2/1987 | United Kingdom . |
| 2170287 | 7/1988 | United Kingdom . |
| WO96/11129 | 4/1996 | WIPO . |

OTHER PUBLICATIONS

Search Report May, 1997 Great Britain

*Primary Examiner*—Hoang Nguyen
*Attorney, Agent, or Firm*—Evenson, McKeown, Edwards & Lenahan, P.L.L.C.

[57] ABSTRACT

A brake system is provided in which, in the normal operation, the brake pressure in the wheel brake cylinders is generated in a power-assisted manner and the master brake lines are closed by change-over valves. During a functional disturbance, the brake pressure in the wheel brake cylinders is built up by way of a master brake cylinder, such that, when the brake pressure control device operates normally also when the switching valves are closed the brake pedal can carry out a pedal travel and, on the other hand, when there are functional disturbances of the brake pressure control device, at most with a slight idling path of the brake pedal, by the operation of the brake pedal in the master brake cylinder and the wheel brake cylinders, a brake pressure can be generated in a conventional manner.

39 Claims, 4 Drawing Sheets

BRAKE LINKAGE AND MASTER BRAKE CYLINDER

BACKGROUND AND SUMMARY OF THE INVENTION

The invention according to the independent claims relates to a brake linkage and to a master brake cylinder as they are generally known in motor vehicles.

In the generally customary construction of brake linkages and master brake cylinders, a connection between the brake pedal and a piston of the master brake cylinder exists which is at least almost free of play. There is a firm connection between the movement of the piston of the master brake cylinder and the pressure of the brake fluid in the master brake lines. As a result, it is ensured that, in every case, the driver can generate a brake pressure in the master brake lines by operating the brake pedal.

Furthermore, it is known, for example, from German Patent Document DE 43 35 769 C1 to fluidically interrupt the master brake lines between a master brake cylinder and wheel brake cylinders by means of change-over valves. In this case, the brake pressure in the wheel brake cylinders required for operating the wheel brakes is generated by other power, particularly by plungers and is controlled or regulated by means of a brake pressure control device. As a result of the closing of the change-over valves, no brake fluid can escape from the master brake cylinder into the wheel brake cylinders so that without any significant pedal travel, immediately a high pressure in the master brake cylinder stands in the way of the operation of the brake pedal. The brake pedal permits no pedal travel and feels "hard". The driver can therefore poorly apportion the brake operation.

It is an object of the invention to further develop a brake system operated in this manner such that, when the brake pressure control device functions normally, also in the case of closed change-over valves, the brake pedal can carry out a pedal travel and, on the other hand, in the case of functional disturbances of the brake pressure control device, a brake pressure can be generated at most with a slight idle path of the brake pedal by operating the brake pedal in the master brake cylinder and the wheel brake cylinders in the conventional manner.

In the case of the brake linkage and the master brake cylinder on which this invention is based, this object is achieved according to certain preferred embodiments of the invention by providing a brake linkage operably connectable between a brake pedal and a piston of a master brake cylinder, a brake pressure being generated by a movement of the piston in the master brake cylinder in at least one working chamber, wherein the brake linkage comprises two rods which are designed to be relatively movable with respect to one another within a given play of movement, and wherein a switchable blocking device is arranged for blocking the relative movement between the two rods.

According to certain other preferred embodiments of the invention, a brake system is provided with a master brake cylinder having a plunger piston acted upon by a brake linkage, and a floating piston arranged between first and second working spaces and fluidically separating the working spaces from one another, each of the two working chambers leading into a master brake circuit, wherein the first working chamber situated between the floating piston and the plunger piston has a displacement duct leading out of the master brake cylinder, the displacement duct being closable by a switching valve.

According to a first construction of the invention, a given play of movement exists between two parts of the brake linkage for a relative movement between the partial elements of the brake linkage. The brake linkage comprises two rods which are arranged coaxially with respect to one another, one of the rods having a hollow-cylindrically constructed end in which an end of the other rod is guided. By means of a blocking device, the relative movement between the two rods can be blocked. Thus, during the operation of the power brake system, a pedal travel simulation is carried out so that the brake pedal does not feel hard to the driver while, when a disturbance occurs in the power brake system by means of the operation of the brake pedal, a brake pressure is generated in the master brake cylinder.

According to further developments of this construction, a switching into the blocked position of the blocking device takes place by means of a forced control, particularly by means of a trip cam which acts upon a detent pawl, the detent pawl being arranged on one of the rods and, by means of the operation, engaging in a detent pawl which is constructed on the other rod.

According to another development of the invention, the operating of the blocking device takes place by means of a control signal which is generated by a brake pressure control device.

According to a second embodiment of the invention, a displacement duct is entered in a master brake cylinder with two working chambers, the first working chamber, on the one side, being bounded by a plunger acted upon by the brake linkage and, on the other side, being bounded by a floating piston separating the second working chamber, which displacement duct leads from the first working chamber out of the master brake cylinder. The displacement duct can be closed by means of a switching valve.

According to an embodiment of the invention, the switching valve is arranged in the first working chamber of the master brake cylinder. According to additional embodiments, the switching valve is closed by means of a movement of the floating piston if the movement beyond a defined extent results in a reduction of the volume of the second working chamber of the brake booster. According to other embodiments, it is advantageous that the displacement duct leads into a pressure accumulator.

Other objects, advantages and novel features of the present invention will become apparent from the following detailed description of the invention when considered in conjunction with the accompanying drawings.

DETAILED DESCRIPTION OF THE DRAWINGS

Figure 1:
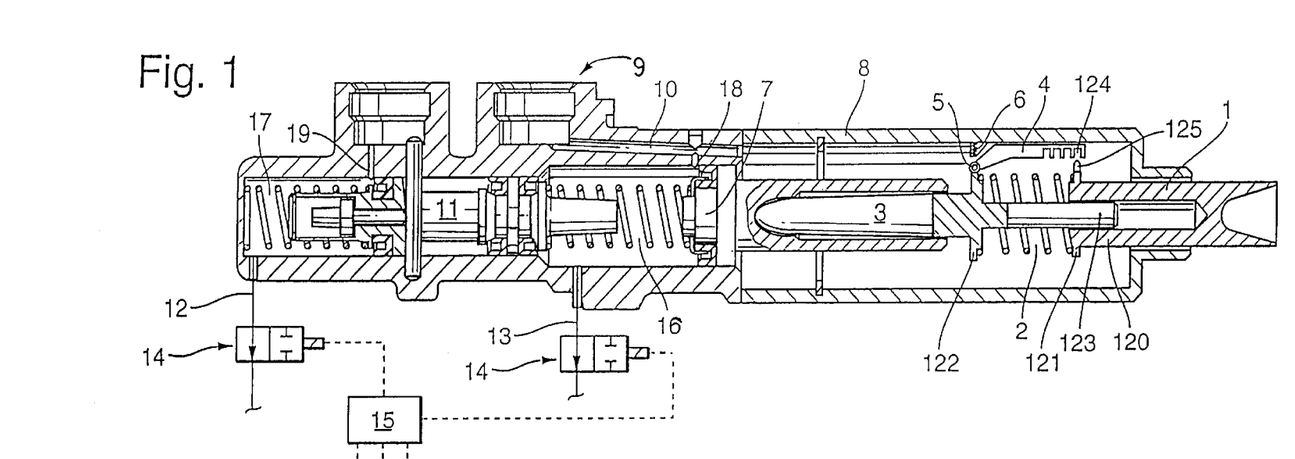
FIG. 1 is a sectional schematic view of a brake system with a master cylinder and a brake linkage, constructed according to a first preferred embodiment of the invention.
Figure 2:
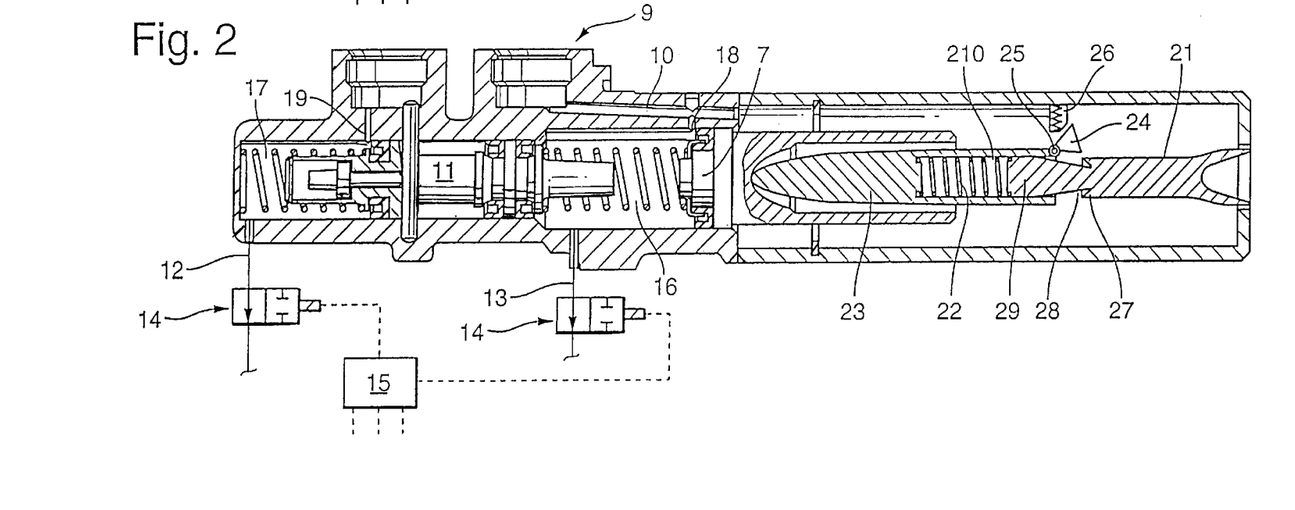
FIG. 2 is a sectional schematic view of a brake system with a master cylinder and a brake linkage, constructed according to a second preferred embodiment of the invention.
Figure 3:
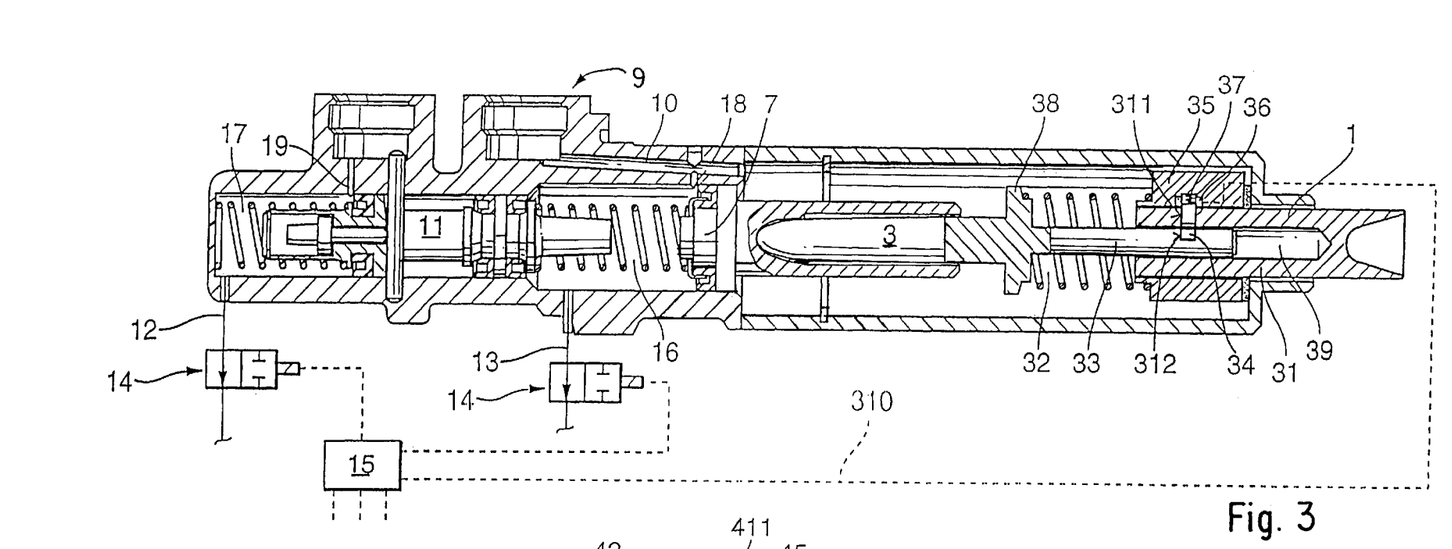
FIG. 3 is a sectional schematic view of a brake system with a master cylinder and a brake linkage, constructed according to a third preferred embodiment of the invention.

FIGS. 1 to 3 show three embodiments of the brake linkage according to the invention. The constructions of the master brake cylinder 9, of the master brake lines 12, 13, of the change-over valves 14 and of the control device 15 correspond to one another in these three embodiments. As long as the brake pedal is not operated, the change-over valves 14 are in their inoperative rest position. The fluidic connection between the two working chambers 16, 17 of the master brake cylinder 9 and the respective assigned wheel brake cylinders, which are not shown here, by way of the master brake lines 12, 13 is established.

When the brake of the vehicle is operated—as long as there is no fault report concerning the function of the power brake system—(in the following also called normal case), the change-over valves 14 are closed by means of the control unit 15. Thus, no brake fluid can escape from the working chambers 16, 17 of the master brake cylinder 9 into the master brake lines 12, 13 and the wheel brake cylinders. The required wheel brake pressure corresponding to the driver's wish is generated by the power brake device in the wheel brake cylinders, possibly while taking into account brake pressure controls which are to cause a stabilizing of the vehicle.

By means of the operating force applied by the driver and acting upon the brake pedal, first the pistons 7 and 11 of the master brake cylinder 9 are displaced so far in the direction of a pressure buildup in the working chambers 16, 17 until the breather holes 18, 19 of the working chambers 16, 17 leading to a brake fluid reservoir are closed. The pistons 7, 11 can travel only this short path without pressure buildup in the working chambers 16 and 17.

However, if it was determined that a functional disturbance exists in the power brake system, the closing of the change-over valve 14 by the control unit 15 will not take place. As soon as a relative movement of the two rods with respect to one another is blocked by means of the respective blocking device, which will be described in detail in the following, the operating force of the brake pedal which is applied by the driver and is possibly boosted by a brake booster which is not shown, is applied by way of the mechanical connection to the pistons 7,11 of the brake booster. In a conventional method of operation of the master brake cylinder, the pistons 7, 11 move as a result of the introduced force and reduce the volume of the working chambers of the master brake cylinder. First, the breather holes 18, 19 will close and then brake fluid is displaced from the working chambers into the wheel brake cylinders. The brake pressure counteracting the operation of the brake pedal is built up in the working chambers and the wheel brake cylinders until an equilibrium of force is established. By the movement of the pistons, particularly by the movement of the piston 7, a path is generated of the brake linkage 1, 3; 21, 23; 31, 33 which is in a fixed relationship with respect to the operating force of the brake pedal. In addition, the illustrated master brake cylinder 9 has all fall-back functions provided in the case of generally conventional master brake cylinders in the case of leakages in individual brake circuits which are not described here in detail.

Figure 4:
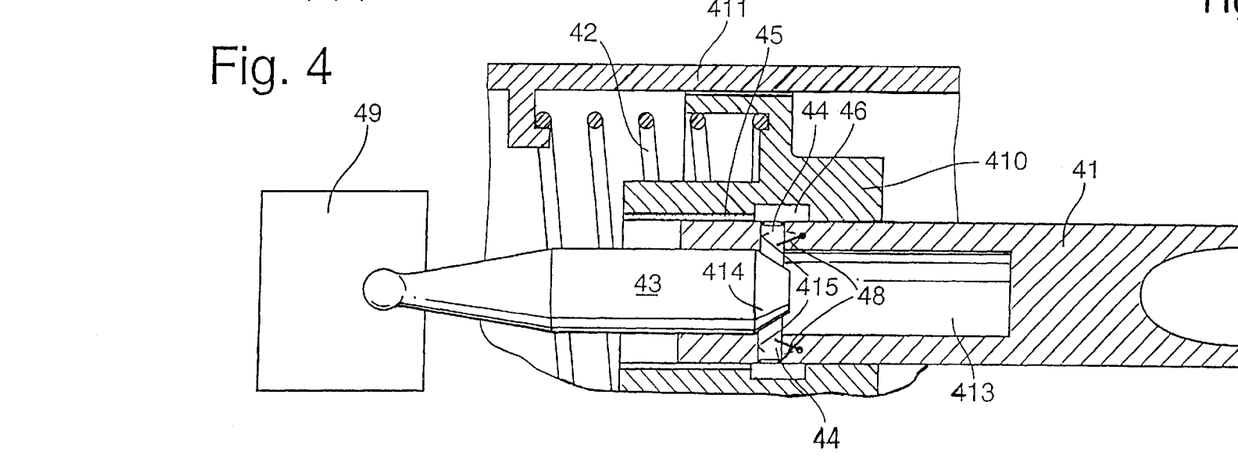
FIG. 4 is a sectional schematic view of a brake linkage constructed according to a fourth preferred embodiment of the present invention, coupled to a schematically depicted master brake cylinder.

The previous representations apply in the same manner to FIGS. 1 to 3 as well as to FIG. 4, FIG. 4 including only a schematic representation of the master brake cylinder 49. In its construction, it may correspond to the master brake cylinder of FIGS. 1 to 3.

According to the embodiment illustrated in FIG. 1, the part of the brake linkage 1, 3 is guided in a housing 8 in which the relative movement between the two rods 1, 3 takes place. The housing 8 is connected with the housing of the master brake cylinder 9. The rod 1 of the brake linkage mechanically connected with the brake pedal projects into the housing 8 by means of its hollow-cylindrical end 120. In the hollow-cylindrical end 120, an end 123 of the second rod 3 is guided; the other end of the second rod is connected with the plunger piston 7 of the master brake cylinder 9. The play of the relative movement of the two rods with respect to one another is determined by the extent by which the end 123 of the second rod 3 can dip into the hollow-cylindrical end 120 of the rod 1. A supporting ring 121 is molded to the hollow-cylindrical end 120 of the first rod 1. A supporting ring 122 is also molded to the second rod 3 on the side facing the first rod 1 and being situated outside the play of movement. A restoring spring 2 is arranged between the two supporting rings. A detent pawl 4 is pivotally connected to the supporting ring 122 of the second rod 3, a spring, particularly a flat coil spring which is stressed with respect to torsion, being arranged in the joint 5 and holds the detent pawl in the position releasing the relative movement. On the housing 8, a trip cam 6 is arranged or molded out which projects toward the interior and is situated approximately at the level of the joint 5. Preferably the trip cam is formed of a slightly elastic material. The trip cam projects beyond the length of the restoring spring 2 in the inoperative position into the area of the first bar 1 on which the detent nose 125 is formed. Opposite the detent nose 125, at least one, preferably several detent holes 124 preferably designed in the shape of a tooth are constructed on the detent pawl 4.

In the normal case, the detent pawl 4 rests at most against the trip cam 6; the detent pawl 4 is not operated. The relative movement between the two rods 1, 3 is possible within the scope of the play of movement against the effect of the restoring spring 2, in which case, because the plunger piston 7 does not move beyond the breather hole 18 with the force acting against it, the driver feels the force resulting from the compression of the restoring spring 2.

In the case of a functional disturbance, the plunger piston will move beyond the position covering the breather hole 18 and the detent pawl 4 is pressed down by the trip cam 6. As a result, the detent nose 125 will now project into the detent hole 124 which results in the establishment of a connection between the two rods 1, 3 which is force-locking in the axial course direction of the rods 1, 3. By means of this connection, the force acting upon the brake pedal is transmitted completely to the plunger piston 7. A lengthening of the pedal travel is prevented because of the rigid connection. After the release of the brake pedal, the trip cam 6 will no longer act upon the detent pawl 4, and the detent pawl 4 is acted upon by the spring in the joint 5 in such a manner that the detent pawl 4 is again situated outside the engagement of the detent nose 4.

For improving the force-locking connection between the two rods 1, 3, in a radially uniformly distributed manner, several, particularly three detent pawls with pertaining detent noses and trip cams can be arranged. The trip cams can also be constructed as a continuous ring in the housing 8.

FIG. 2 shows an arrangement which is simplified with respect to FIG. 1. The method of operation of the implementing function illustrated in FIG. 2 corresponds to the embodiment of FIG. 1 so that here only the differences in the embodiment are shown.

The function of the large detent pawl 4 from FIG. 1 is taken over by the short, approximately triangular detent pawl 24 which is pivotally connected at the vertex in the joint 25, is held in the shown opening position by means of a spring in the joint 25 and is pressed down by the trip cam 26 in the case of a functional disturbance. In the area of the detent pawl 24, the second rod 21 has a notch 28 into which the detent pawl 24 is pressed down. In order to ensure a better transmission of force, a switching ring 27 is constructed on the second rod 21 on the brake-pedal-side end of the notch 28. The first rod 23 having the hollow-cylindrical section 210 is connected with the plunger piston 7. The restoring spring 22 is arranged in the interior of the hollow-cylindrical section 210 of the rod 23. The end 29 of the second rod 21 is guided in the hollow-cylindrical section 210 and rests against the restoring spring 22.

By means of the blocking device designed in this manner, a relative movement between the two rods 21, 23 is blocked only in the direction of the operation of the brake pedal but not in the direction of the release of the brake pedal. Thus, the blocking generated by the blocking device can be stressed only with respect to pressure but not with respect to pull.

The embodiment according to FIG. 3 differs from the two preceding developments essentially because of the fact that the mechanical connection between the two rods 31, 33 of the brake linkage is established and released by means of a blocking which can be controlled by means of an electromagnet. The construction of the second rod 33 connected with the plunger piston 7 corresponds to the second rod 3 from FIG. 1 and also has a supporting ring 38 for a restoring spring 32. In this case, the restoring spring 38 is arranged again outside the hollow-cylindrically constructed end 39 between the two rods 31, 33. The end of the restoring spring 35 facing away from the supporting ring 38 is in this case supported on a sleeve 35. In the sleeve 35, an electromagnet 36 is arranged which is controlled by way of the control line 310 by the control unit 15. The electromagnet acts upon a bolt 34 which is prestressed by the spring 37 in the direction of the second rod 33. The bolt penetrates the first rod 31 in a bore 311 and, in the inoperative position of the brake pedal, is disposed opposite a bore or a groove 312 in the second rod 33.

In the normal case, the electromagnet 36 is energized at the start of the brake operation so that the bolt reaches a position against the force of the spring 37 in which it mechanically connects the first rod 31 and the sleeve 35 with one another. When the brake pedal is operated, the plunger piston is first moved in the direction of a reduction of the volume of the working chamber 16 until the breather hole 18 is closed. Then, by means of the movement of the sleeve 35, the restoring spring 32 is moved in the direction of the now stationary second rod 33.

When a functional disturbance is present, the controlling of the electromagnet 36 will not take place so that the bolt 34 penetrates the bore 311 and the groove 312. The bolt 34 mechanically connects the two rods 31 and 33 so that, when the brake is operated, the forces introduced in the brake pedal will act completely upon the plunger piston 7. It is clear that, also in the case of this construction, the arrangement of several blocking devices which are constructed as described above and are arranged radially at regular distances will improve the transmission of force between the two rods 31, 33 and also between the first rod 31 and the sleeve 35.

Thus, in this embodiment of the invention, when the switchable blocking device is in an inoperative position, the relative movement between the two rods 33, 31 is blocked while in the operated position of the switchable blocking device which is shown in the drawing, the relative movement is released.

FIG. 4 illustrates another embodiment of the invention which causes a blocking of the relative movement between the two rods by means of mechanical detent pawls. The arrangement differs from the embodiments according to FIG. 1 to 3 in that the restoring spring 42 is not supported between the two rods 41, 43 of the brake linkage. On the contrary, the restoring spring 42 is supported on a sleeve 410 and a supporting wall 411. In this case, the sleeve 410 is disposed in a displaceable manner on the first rod 41 connected with the brake pedal. The second rod 43 is guided in the hollow-cylindrical end 413 of the first rod 41 and, on the other side, is connected with the piston of a master brake cylinder 49 which is illustrated only symbolically. On its end, which projects into the hollow-cylindrical end 413 of the first rod 41, it has a truncated-cone-shaped chamfering 414. In the inoperative position of the brake linkage, detent pawls 44 are arranged in bores 415 which are radially uniformly spaced and penetrate the wall of the hollow-cylindrical end 413, which detent pawls 44 rest against the truncated-cone-shaped chamfering 414 of the second rod 43. The detent pawls 44 are acted upon in the direction of the truncated-cone-shaped chamfering 414 by means of leaf springs 48 which are arranged in the wall of the hollow-cylindrical end of the first rod 41 and project into the bores 415. In the area which, in the inoperative position of the brake pedal, is situated opposite the detent pawls 44, the sleeve 410 has a groove 46. The end of the groove 46 situated on the side of the master brake cylinder 49 is displaced, from the corresponding edge of the detent pawl 44 at most by the path of the piston until the breather hole of the working chamber is closed, toward the front in the direction of the master brake cylinder 49. The area of the sleeve which extends in front of the groove in the direction of the master brake cylinder is equipped with a slide rail 45.

During the brake operation, in the normal case, the second rod 43 moves until the breather holes in the master brake cylinder 49 are covered. The first rod 41 slides with its hollow-cylindrical end 413 over the second rod 43; the detent pawls 44 are pressed toward the outside into the groove 46. A mechanical connection is established between the first rod 41 and the sleeve 410. The relative movement between the first rod 41 and the second rod 43 is released so that the forces acting upon the brake pedal are supported by way of the spring 42 on the supporting wall, in which case the spring 42 is compressed.

When a functional disturbance exists and a conventional brake operation takes place, the rod 43 moves farther than merely for covering the breather holes. In the case of a further pressure buildup in the master brake cylinder, the detent pawls 44 are acted upon by means of a force which presses them to the outside. An escaping of the detent pawls 44 into the groove 46 is no longer possible because it has already been passed. On the contrary, the detent pawls 44 are supported on the slide rail 45. Since they are therefore still situated in the moving space of the second rod 43 with respect to the first rod 41, the relative movement with respect to one another is blocked, and the force introduced into the first rod 41 is transmitted completely to the wheel brakes. A construction with an electromechanical, hydraulic or pneumatic triggering of the detent pawls 44 is also conceivable.

Figure 5:
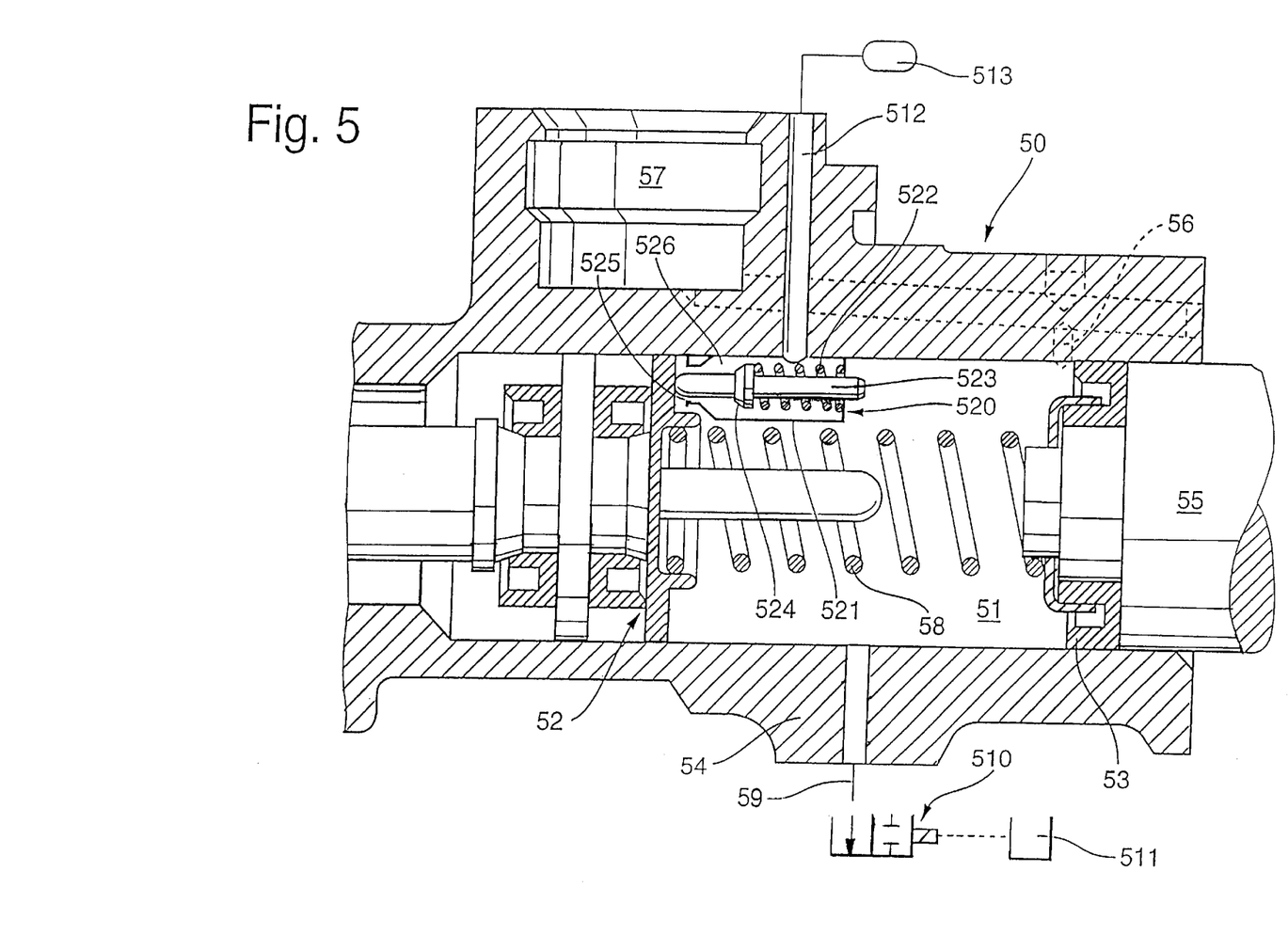
FIG. 5 is a view of a further embodiment including a master brake cylinder construed according to the invention.
Figure 6:
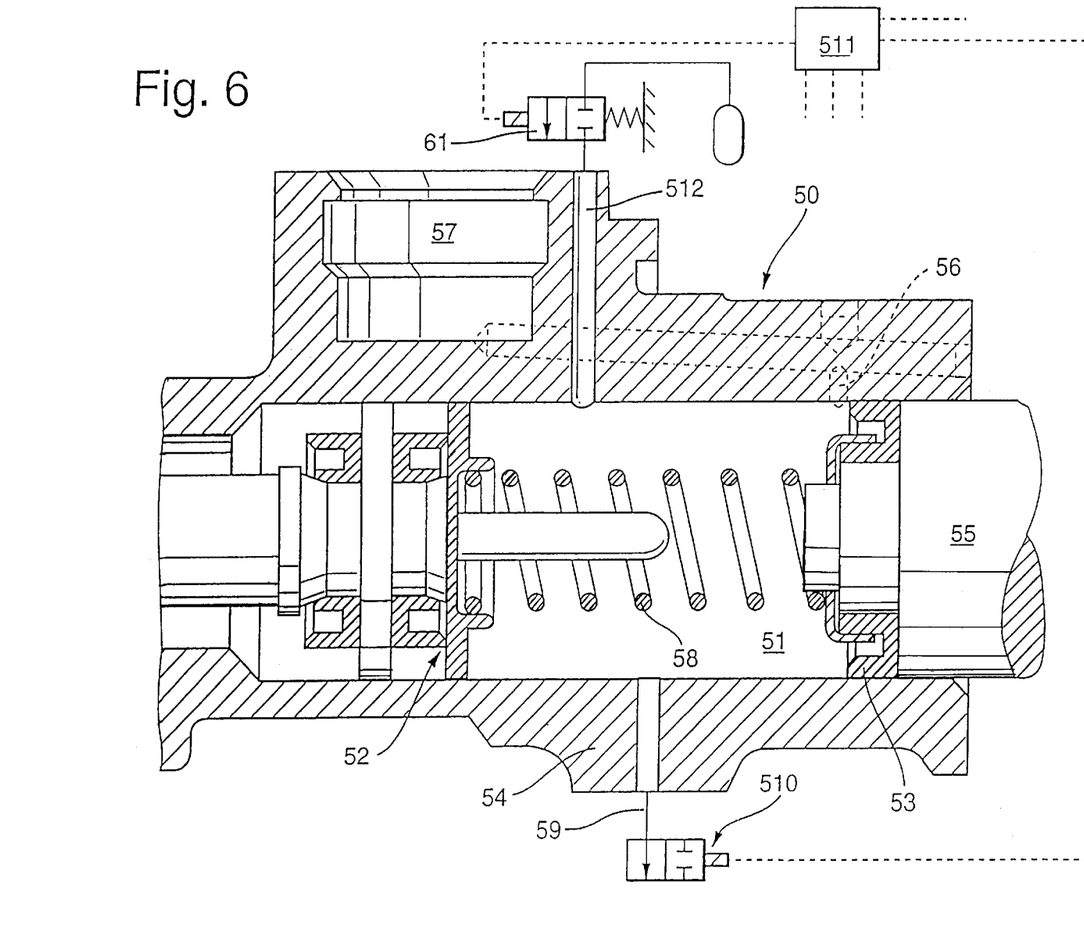
FIG. 6 is a view of a further embodiment including a master brake cylinder constructed according to the invention.

FIGS. 5 and 6 show two embodiments of a master brake cylinder according to the invention which hardly differ in their construction. The two figures each are sectional views of the master brake cylinder, in each case only the area of the first working chamber being shown. Otherwise, the master brake cylinder may, for example, have the same construction as the master brake cylinder 9 illustrated in FIG. 1.

First, the construction and the method of operation which FIGS. 5 and 6 have in common will be described. Then the special characteristics of the two embodiments will be illustrated.

The first working chamber 51 of the master brake cylinder is bounded by the floating piston 52 and the plunger piston 53 in the housing 54 of the master brake cylinder 50. By way of the brake linkage 55, the brake force generated at the brake pedal is introduced into the plunger piston 53. In the inoperative rest position of the brake pedal, the working chamber 51 is fluidically connected by way of the breather hole 56 with the connection piece 57 and thus with a brake fluid reservoir which is not shown. A defined inoperative position of the two pistons 52, 53 is provided by the restoring spring 58 arranged between them. The first working chamber also has two fluidic connections which lead out of the master brake cylinder 50. On the one hand, this is the master brake line 59 and, on the other hand, it is the displacement duct 512. The master brake line 59 can be blocked by the change-over valve 510 which is controllable by the control device 511. The displacement duct can be blocked by means of a switching valve which will be described in the following. The displacement duct 512 is fluidically connected with a pressure accumulator 513.

When the brake is operated in the normal case, the plunger piston 53 and the floating piston 52 will first move until the breather hole 56 of the first working chamber and the breather hole of the second working chamber, which is not shown, are closed by the respective piston. The master brake line 59 is closed by the change-over valve 510. The same takes place at the second working chamber which is not shown. In this condition, brake fluid can escape from the master brake cylinder 50 only by way of the displacement duct 512. It arrives in the pressure accumulator 513. The rising pressure in the pressure accumulator 513 counteracts the operating force of the brake pedal by the driver. The plunger piston 55 can continue to move in the direction of a reduction of the volume of the first working chamber 51. The carrying-out of a pedal travel is possible by means of the at least approximately pressure-resistant brake linkage 55. A firm relationship exists between the pedal travel and the operating force of the brake pedal required for achieving this pedal travel. In the case of a suitable accumulator volume—pressure characteristic of the pressure accumulator 513, at least approximately the same characteristic path—force curve can be produced which is obtained if the brake fluid were displaced from the master brake cylinder into the wheel brake cylinders. A brake pressure is controlled into the wheel brake cylinders by way of the power brake system.

However, when there is a function disturbance of the power brake system, the change-over valves 510 are not closed. After the breather holes 56 were closed, brake fluid can be displaced from the two working chambers of the master brake cylinder into the wheel brake cylinders. No later than a short time after the respective breather hole 56 was closed by the plunger piston 53 or the floating piston 52, the switching valve of the displacement duct 512 must also be closed. Brake fluid can escape from the first working chamber only through the master brake line 59. Brake pressure in the wheel brakes is built up in the conventional manner.

The following descriptions explain the specific characteristics of the embodiments according to FIG. 5 and FIG. 6.

According to the embodiment of FIG. 5, the switching valve of the displacement duct 512 is constructed as a mechanically switching valve 520. In a valve housing 521, which surrounds a valve chamber 526, a closing spring 522 is arranged which acts such upon a valve tappet 523 penetrating the valve housing 521 that a sealing ring 524 constructed at the valve tappet 523, when the valve tappet 523 is not acted upon, closes the only fluidic connection 525 between the first working chamber 51 and the valve chamber 526 in a fluid-tight manner. The displacement duct 512 leads into the valve chamber 526. In the inoperative position of the brake pedal, the floating piston 52 pushes the valve tappet 523 so far against the effect of the closing spring 522 that a fluidic connection is established between the valve chamber 526 and the first working chamber 51. As a result, brake fluid can escape by way of the displacement duct 512 from the first working chamber into the pressure accumulator 513. When the brake pedal is operated, the floating piston 52 moves away from the valve 520.

In the normal case, this takes place until the breather hole of the second working chamber is closed by the floating piston 52. Then, the floating piston 52 will be stationary because, as a result of the master brake line blocked by a change-over valve, no more brake fluid can escape from the second working chamber. Also in this position, the floating piston 52 presses on the valve tappet 523 such that the fluidic connection 525 between the first working chamber 51 and the valve chamber 526 is established.

When a functional disturbance occurs, the change-over valve of the second working chamber is not closed so that the floating piston moves farther away from the valve 520. A small distance (less than 1 mm) behind the moving distance which it has travelled after closing the breather hole, the floating piston 52 separates from the valve tappet 523 and the sealing ring 524 closes the fluidic connection 525 between the valve chamber 526 and the first working chamber 51. As a result, no more brake fluid can escape through the displacement duct 512 from the first working chamber 51. A brake pressure buildup therefore takes place in the conventional manner of a master brake cylinder. By way of the master brake lines 59, the brake pressure is introduced into the wheel brakes.

According to the embodiment of FIG. 6, the switching valve of the displacement duct 512 is constructed as an electromagnetic valve 61 which can be switched by the control device 511. In the inoperative position, the electromagnetic valve closes the fluidic connection between the displacement duct 512 and the pressure accumulator 513. As soon as the brake is operated, which can be detected, for example, by way of the position of the brake light switch, it is examined whether a functional disturbance exists of the power brake system or of the change-over valves. If this is so, the valve 61 and the change-over valves 510 remain inoperative and the brake pressure buildup in the wheel brake cylinders takes place in the conventional manner by way of the master brake cylinder. Otherwise, the change-over valves 510 and the valve 61 are operated. The fluidic connection between the pressure accumulator 513 and the first working chamber 51 is established. Thus, in the desired manner, brake fluid can escape from the working chamber, and, by way of the still displaceable plunger piston 53, the brake pedal can be permitted to carry out a pedal travel.

According to a particularly operationally reliable embodiment, the change-over valve 510 and the valve 61 can be combined to form a 4-2 way valve, in one switching position, the fluidic connection between the first working chamber 51 and the wheel brake cylinder being opened and the fluidic connection between the working chamber 51 and the pressure accumulator 513 being closed, while in the second switching position, the fluidic connection between the first working chamber 51 and the wheel brake cylinders is closed and the fluidic connection between the working chamber 51 and the pressure accumulator 513 is open.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Brake linkage operably connectable between a brake pedal and a piston of a master brake cylinder, a brake pressure being generated by a movement of the piston in the master brake cylinder in at least one working chamber, wherein the brake linkage comprises two rods which are designed to be relatively movable with respect to one another within a given play of movement, and wherein a switchable blocking device is arranged for blocking the relative movement between the two rods in response to relative movement of the two rods beyond said given play of movement.

2. Brake linkage according to claim 1, wherein the two rods extend coaxially with respect to one another, one of the two rods having a hollow-cylindrical construction on one end, and the other of the two rods being guided with its end in a relatively movable manner in the hollow-cylindrical end.

3. Brake linkage according to claim 1, wherein the relative movement between the two rods takes place against the effect of a restoring spring.

4. Brake linkage according to claim 1, wherein the switching blocking device is changed to a switching position blocking the relative movement of the two rods with respect to one another when the stroke of the piston in the master brake cylinder exceeds a switching threshold value.

5. Brake linkage according to claim 2, wherein the switching blocking device is changed to a switching position blocking the relative movement of the two rods with respect to one another when the stroke of the piston in the master brake cylinder exceeds a switching threshold value.

6. Brake linkage according to claim 3, wherein the switching blocking device is changed to a switching position blocking the relative movement of the two rods with respect to one another when the stroke of the piston in the master brake cylinder exceeds a switching threshold value.

7. Brake linkage according to claim 4, wherein the switching operation of the blocking device takes place by means of a forced control.

8. Brake linkage according to claim 7, wherein the forced control is formed in that a trip cam is arranged on a housing which at least partially encloses the two rods, which trip cam when the stroke of the piston exceeds the shifting threshold value, changes a detent pawl held in its open position by means of a holding spring into its closed position, a mechanical connection being established between the two rods in the closed position of the detent pawl which can be stressed at least with respect to pressure.

9. Brake linkage according to claim 8, wherein the detent pawl and the holding spring are either fastened on the first rod or on the second rod, and wherein a detent nose is formed on the second rod or on the first rod, whereby a force-locking connection is established between the detent nose and the detent pawl in the closed position of the detent pawl.

10. Brake linkage according to claim 6, wherein the switching operation of the blocking device takes place by means of a forced control.

11. Brake linkage according to claim 10, wherein the forced control is formed in that a trip cam is arranged on a housing which at least partially encloses the two rods, which trip cam when the stroke of the piston exceeds the shifting threshold value, changes a detent pawl held in its open position by means of a holding spring into its closed position, a mechanical connection being established between the two rods in the closed position of the detent pawl which can be stressed at least with respect to pressure.

12. Brake linkage according to claim 11, wherein the detent pawl and the holding spring are either fastened on the first rod or on the second rod, and wherein a detent nose is formed on the second rod or on the first rod, whereby a force-locking connection is established between the detent nose and the detent pawl in the closed position of the detent pawl.

13. Brake linkage according claim 1, wherein a control device determines from signals supplied to it that a blocking of the relative movement between the two rods is required, and wherein corresponding control signals of a switching device trigger a required switching operation of the blocking device.

14. Brake linkage according to claim 2, wherein a control device determines from signals supplied to it that a blocking of the relative movement between the two rods is required, and wherein corresponding control signals of a switching device trigger a required switching operation of the blocking device.

15. Brake linkage according to claim 3, wherein a control device determines from signals supplied to it that a blocking of the relative movement between the two rods is required, and wherein corresponding control signals of the switching device trigger a required switching operation of the blocking device.

16. Brake linkage according to claim 4, wherein a control device determines from signals supplied to it that a blocking of the relative movement between the two rods is required, and wherein corresponding control signals of the switching device trigger a required switching operation of the blocking device.

17. Brake linkage according claim 1, wherein the blocking effect of the switchable blocking device only acts such that a relative movement between the two rods which shortens the total length formed by the two rods is blocked, whereas an opposite relative movement within the scope of the given play of movement can be carried out in an unblocked manner.

18. Brake linkage according to claim 2, wherein the blocking effect of the switchable blocking device only acts such that a relative movement between the two rods which shortens the total length formed by the two rods is blocked, whereas an opposite relative movement within the scope of the given play of movement can be carried out in an unblocked manner.

19. Brake linkage according to claim 3, wherein the blocking effect of the switchable blocking device only acts such that a relative movement between the two rods which shortens the total length formed by the two rods is blocked, whereas an opposite relative movement within the scope of the given play of movement can be carried out in an unblocked manner.

20. Brake linkage according to claim 4, wherein the blocking effect of the switchable blocking device only acts such that a relative movement between the two rods which shortens the total length formed by the two rods is blocked, whereas an opposite relative movement within the scope of the given play of movement can be carried out in an unblocked manner.

21. Brake linkage according to claim 1, wherein an at least one fluidic connection between the at least one working chamber of the master brake cylinder and the wheel brake cylinders is constructed to be interruptable by one shut-off valve respectively, a blocking of the relative movement between the two rods taking place if, during an operation of the brake, a closing of the shut-off valve does not take place.

22. Brake linkage according to claim 21, wherein the two rods extend coaxially with respect to one another, one of the two rods having a hollow-cylindrical construction on one end, and the other of the two rods being guided with its end in a relatively movable manner in the hollow-cylindrical end.

23. Brake linkage according to claim 8, wherein an at least one fluidic connection between the at least one working chamber of the master brake cylinder and the wheel brake cylinders is constructed to be interruptable by one shut-off valve respectively, a blocking of the relative movement between the two rods taking place if, during an operation of the brake, a closing of the shut-off valve does not take place.

24. Master brake cylinder having a plunger piston acted upon by a brake linkage, a floating piston arranged between first and second working spaces and fluidically separating the working spaces from one another, each of the two working chambers leading into a master brake circuit, wherein the first working chamber situated between the floating piston and the plunger piston has a displacement duct leading out of the master brake cylinder, the displacement duct being closable by a switching valve, and wherein the switching valve is arranged in the first working chamber and is fastened on a side wall of the master brake cylinder.

25. brake cylinder according to claim 24, wherein the switching valve of the displacement duct can be switched by a control device.

26. Master brake cylinder according to claim 25, wherein the switching valve is closed in the inoperative condition of the brake, when the brake is operated, the switching valve being changed to a control condition opening the displacement duct as soon as the control device generates a signal which represents an undisturbed operation of a power brake system.

27. Master brake cylinder according to claim 24, wherein the displacement duct is arranged outside the movement range of the plunger piston and the floating piston which may be used when the brake is operated.

28. Master brake cylinder according to claim 25, wherein the displacement duct is arranged outside the movement range of the plunger piston and the floating piston which may be used when the brake is operated.

29. Master brake cylinder according to claim 26, wherein the displacement duct is arranged outside the movement range of the plunger piston and the floating piston which may be used when the brake is operated.

30. Master brake cylinder according to claim 26, wherein the switching valve is arranged in the first working chamber and is fastened on a side wall of the master brake cylinder.

31. Master brake cylinder according to claim 27, wherein the switching valve is arranged in the first working chamber and is fastened on a side wall of the master brake cylinder.

32. Master brake cylinder according to claim 24, wherein switching operations of the switching valve are caused by a movement of the floating piston in the master brake cylinder, the switching valve being held open in the inoperative rest position of the floating piston and a closing of the switching valve taking place when the floating piston has moved beyond a given extent into the direction causing a reduction of the volume of the second working chamber.

33. Master brake cylinder according to claim 32, wherein the given extent is slightly larger than the path which the floating piston must cover in order to cover a breather hole, which ensures the supply of brake fluid from a reservoir into the working chamber, and thus interrupt this fluidic connection.

34. Master brake cylinder according claim 24, wherein the displacement duct leads into a pressure accumulator.

35. Master brake cylinder according to claim 26, wherein the displacement duct leads into a pressure accumulator.

36. Master brake cylinder according to claim 33, wherein the displacement duct leads into a pressure accumulator.

37. A vehicle brake system comprising:

a brake fluid circuit including a master brake cylinder operably connected between a brake pedal and at least one wheel brake cylinder so as to generate brake pressure in the at least one wheel brake cylinder in a power assisted manner during normal operation with an in tact brake fluid circuit, and a control arrangement which facilitates non-power assisted operation of the master brake cylinder and the at least one brake cylinder during functional disturbances of the brake fluid circuit with at most a slight idling path of the brake pedal.

38. A vehicle brake system according to claim 37, wherein the control arrangement includes a brake linkage operably connectable between a brake pedal and a piston of a master brake cylinder, a brake pressure being generated by a movement of the piston in the master brake cylinder in at least one working chamber, wherein the brake linkage comprises two rods which are designed to be relatively movable with respect to one another within a given play of movement, and wherein a switchable blocking device is arranged for blocking the relative movement between the two rods.

39. A vehicle brake system according to claim 37 wherein the master brake cylinder has a plunger piston acted upon by a brake linkage, and wherein the control arrangement includes a floating piston arranged between first and second working spaces and fluidically separating the working spaces from one another, each of the two working chambers leading into a master brake circuit, wherein the first working chamber situated between the floating piston and the plunger piston has a displacement duct leading out of the master brake cylinder, the displacement duct being closable by a switching valve.

* * * * *